May 30, 1972  C. G. MORTON  3,666,596

METHOD FOR IMPROVING STRIPPABILITY OF INSULATION FROM WIRE

Filed July 1, 1970

INVENTOR
CHARLES G. MORTON
BY R. Jonathan Peters
ATTORNEY

3,666,596
METHOD FOR IMPROVING STRIPPABILITY OF INSULATION FROM WIRE

Charles G. Morton, Chelmsford, Mass., assignor to General Electric Company
Filed July 1, 1970, Ser. No. 51,534
Int. Cl. H02g 1/12; B32b 35/00
U.S. Cl. 156—344            4 Claims

ABSTRACT OF THE DISCLOSURE

In order to improve the strippability of insulation from wire, the insulated wire is wound taut over two spaced-apart capstan wheels. One capstan wheel is provided with an annular section of enlarged diameter, and the last turn of the wire on its travel to the take-up reel is passed over this annular section. The conductor and insulation are stretched thereby substantially loosening or breaking the bond between the insulation and conductor, and the insulation then may be readily stripped from the wire.

---

Figure 1:
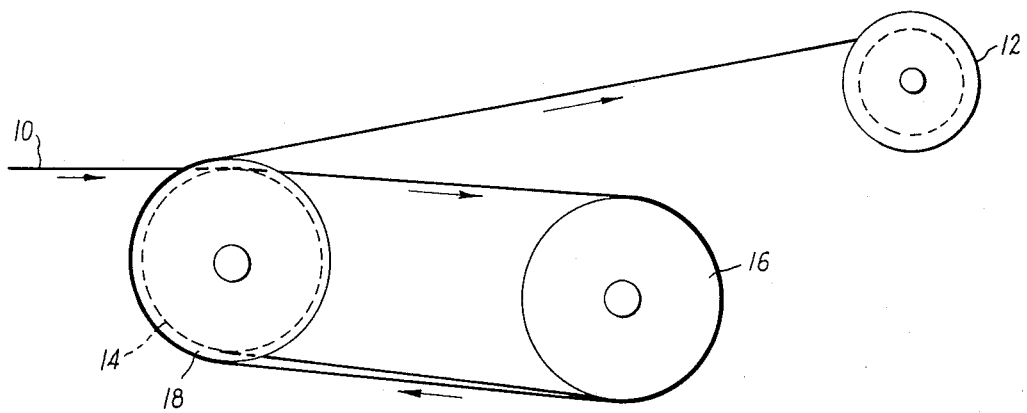

This invention relates to insulated wire or cable. In its more specific aspect, this invention relates to a method for obtaining insulated wire or cable having improved strippability.

The terms "wire" and "cable" are used herein and in the appended claims as synonomous terms and refer to a conductor covered with an insulation.

With the advent of commercially available organic polymers, a large volume of wire manufactured for todays market is insulated with a solid dielectric. Useful solid dielectrics which have been employed extensively as wire insulation include, for example, ethylene polymers and copolymers thereof, such as polyethylene, ethylene propylene, and ethylene vinyl acetate, which may be either thermoplastic or thermosetting, as well as such materials as polyvinyl chloride, styrene butadiene rubber and butyl rubber. These insulating materials may be compounded with carbon black or a mineral filler, as well as with other additives, to enhance the physical and electric properties. In the commercial manufacture of wire, the insulation compound is extruded over the conductor, which may be a single solid conductor or a stranded conductor. Where desired, a suitable release agent such as a silicone lubricant may be applied over the conductor and a separator, such as a paper tape or Mylar tape, may be wrapped around the conductor prior to extruding the insulation compound over the conductor. If the insulating compound is thermosetting, the coated wire is passed through a curing oven, such as a steam chamber maintained under pressure, to cure the organic polymer. Also, the insulation may be jacketed to improve cable performance with an organic polymer or elastomer or with an inorganic layer, such as asbestos, or the cable may be provided with a fibrous or metallic braid. The jacket might provide the wire with such improved properties as flame retardance, oil resistance, moisture resistance, etc. Quite obviously, it is essential that the insulation bond or adhere to the conductor (with or without a separator), but, on the other hand, it is desirable to be able to strip the insulation from the conductor when making a termination or connection.

Strippability is especially important with smaller gauge wires such as those having a gauge of from about 5 to 30 AWG, and more particularly 10 to 20 AWG. Wire of this size, when insulated with a solid dielectric, typically has an insulation wall thickness of about .01 to .1 inch. Wire of this gauge is commonly used in appliances and other apparatus having multiple terminations and connections. In such applications, it is sometimes necessary to provide several bare areas along a relatively short length of insulated wire so as to be able to make connections at these areas in what resembles a bus bar fashion. In order to do this, it is necessary that the insulation be properly bonded to the conductor but yet be strippable.

Figure 2:
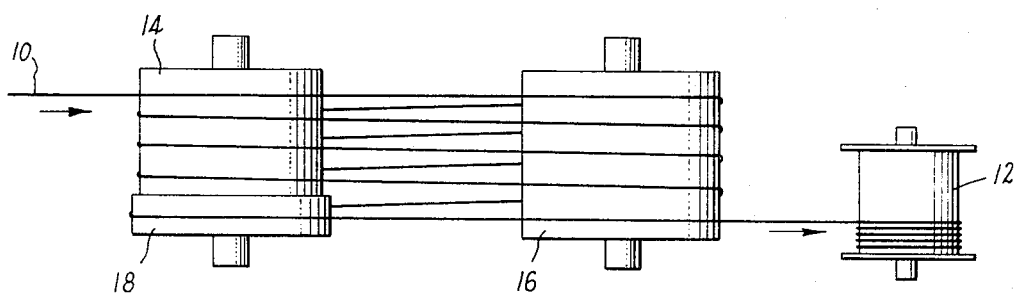
Figure 3:
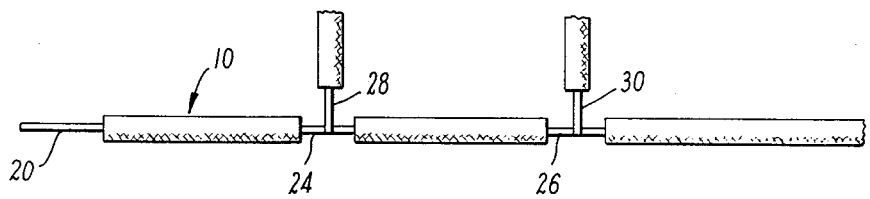

This invention has therefore as its purpose to provide a method for obtaining insulated wire having improved strippability. This, together with other advantages and objects, will best be understood by referring to the following detailed description of the invention, and to the accompanying drawings in which:

FIG. 1 is a side elevational view showing the method of stretching insulated wire in accordance with the invention;
FIG. 2 is a plan view of FIG. 1; and
FIG. 3 illustrates the utility of insulated wire made in accordance with the invention.

Broadly, my invention provides a method for improving strippability of insulation from the conductor where the wire comprises a conductor insulated with a solid dielectric as the primary insulation, e.g. cross-linked polyethylene. According to the invention, multiple turns of the insulated wire are wound taut over a pair of spaced-apart capstan wheels. Each capstan wheel is of uniform diameter, and preferably both wheels have the same diameter, except that one capstan wheel is provided with an annular section of increased diameter. The last turn of the wire on its travel to the take-up reel is passed over this annular section. As a consequence, the conductor and solid dielectric insulation are stretched or elongated by at least about ½ percent in length without substantially decreasing the cross sectional area of the conductor. The stretching substantially loosens or breaks the bond between the conductor and the insulation, and the insulation may be readily stripped from the conductor. The more the wire is stretched, the looser the bond, and therefore the amount of stretching depends upon the degree of looseness desired. It is extremely important that the cross-sectional area of the conductor not be substantially decreased, for otherwise the electrical properties of the wire could be adversely affected. Generally, the industry standard requires that the minimum cross-sectional area be not less than 98 percent of the nominal area. Therefore, the wire should not be stretched more than about 2 percent of its length, but, where desired, the wire can be stretched more than 2 percent by starting with a larger size wire in order to compensate for the reduction in area. The ease of strippability without otherwise adversely affecting the product was wholly unexpected in that both the conductor and insulation are stretched or elongated, and since the insulation has a greater capability for stretching, the loosening of the bond was unexpected.

Referring to the drawings wherein like reference numerals designate similar parts throughout, wire 10 is passed from a fabricating apparatus such as an extruder (not shown) where it was insulated with a solid dielectric. In the case where the wire has been insulated with a cross-linked organic polymer, the wire would be passed through a curing oven, such as a steam chamber maintained under pressure. The wire may be provided with a braid or jacket, which may be applied over the primary insulation in tandem or in a separate operation. A textile or metallic braid or a fibrous jacket tends to compress and tighten the insulation thereby increasing the bond strength between the conductor and insulation. For example, crysotile asbestos, which is a spinnable fiber, is commonly employed as a jacketing material, and the asbestos may be applied over the primary insulation by means of a textile carding apparatus. Thus, the method for providing improved strippability is particularly important with such jacketed wires. On route to take-up reel 12, the wire is wound around a pair of capstan wheels 14 and 16, which are spaced apart a suitable distance. It will be observed that the wire is wound several times around the capstan wheels and maintained in a taut condition. Each capstan wheel has a uniform diameter, and preferably the wheels are of equal diameter, except for annular section 18 which has an enlarged diameter. The last turn of the wire on its travel to the take-up reel is passed over this enlarged annular section, and, as a consequence, the wire is elongated or stretched by at least about ½ percent of its length, and more preferably, about one percent. The wire is then passed to the take-up reel.

As explained hereinabove, the wire processed in accordance with the invention has improved strippability. Because of this unique feature, the wire is adaptable for center strippable applications and, therefore, is especially useful in appliances. This is more clearly illustrated in FIG. 3. Several inches of the insulation are stripped from the end 20 of a cut length of wire 10. At predetermined points along the length of wire, the insulation is cut where it is desirable to make a connection, such as at 24 and 26. The cut lengths of insulation are then slipped along the conductor to provide the bare spots with insulated sections between them for making connections 28 and 30.

It will be observed that by reason of the invention, the wire possesses improved strippability. As a result of the elongation or stretching, the bond between the insulation and conductor has been substantially weakened or broken. Although there is a minimum degree of bonding, the insulation fits snugly so that the insulation is retained around the wire and the wire can be properly handled, but the insulation can be easily stripped from the conductor where it is desired to make a connection.

I claim:

1. A method of improving the strippability of insulated wire comprised of a conductor insulated with a covering, comprising the steps of winding multiple turns of wire comprised of a conductor insulated with a covering of solid dielectric over first and second capstans which are spaced apart from each other, and one of said capstans having an annular section of enlarged diameter, passing the last turn of said wire over the said enlarged annular section of the one capstan to stretch the wire on its travel to a take-up reel, and winding the said wire on the said take-up reel, whereby the wire comprised of a conductor insulated with a covering of solid dielectric is stretched by at least about one-half percent in length without substantially decreasing the cross-sectional area of the conductor thereby loosening the insulating covering of solid dielectric and rendering it more easily strippable from the conductor.

2. In the method according to claim 1 wherein said wire is insulated with a cross-linked ethylene polymer or copolymer.

3. In the method according to claim 1 wherein said conductor and solid dielectric insulation are stretched by about one percent in length.

4. In the method according to claim 1 wherein said wire is insulated with a cross-linked ethylene polymer or copolymer and an overlying jacket comprising asbestos, and said conductor and said insulation are stretched by about one percent in length.

References Cited
UNITED STATES PATENTS 3,502,534   3/1970   Griset _____ 156—344

BENJAMIN A. BORCHELT, Primary Examiner

J. V. DORAMUS, Assistant Examiner

U.S. Cl. X.R.

81—9.5; 156—344